A. E. CARLTON.
HOOK.
APPLICATION FILED OCT. 17, 1918.
1,299,424.  Patented Apr. 8, 1919.
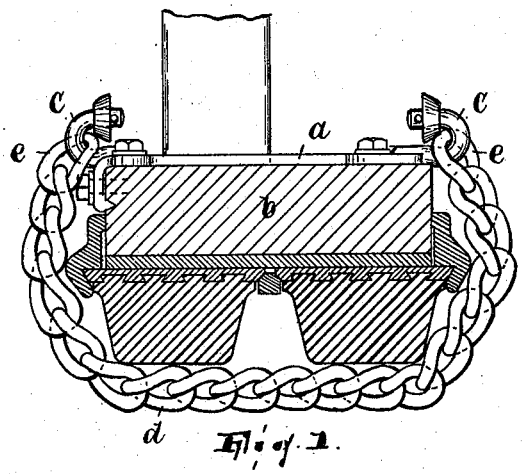
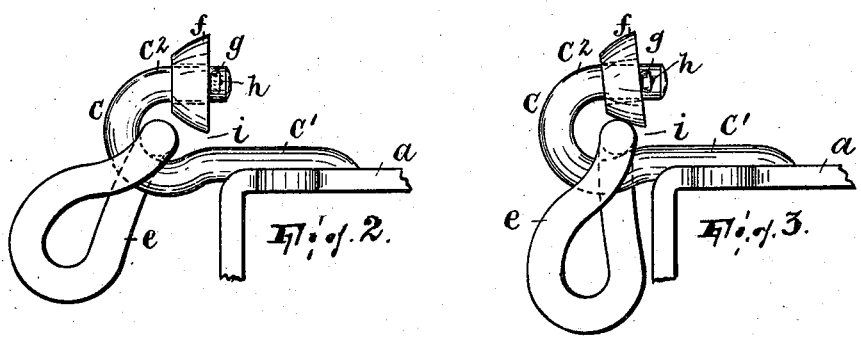
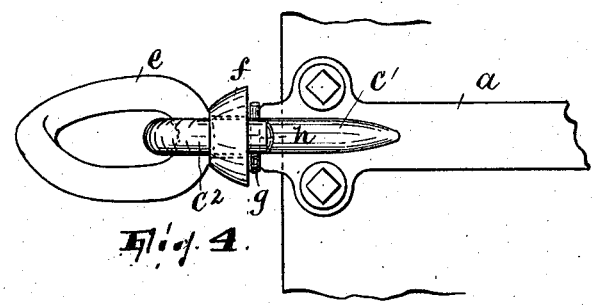
WITNESS:
INVENTOR,
Anson E. Carlton,
BY
ATTORNEY

UNITED STATES PATENT OFFICE.

ANSON E. CARLTON, OF PATERSON, NEW JERSEY.

HOOK.

1,299,424.  Specification of Letters Patent.  Patented Apr. 8, 1919.

Application filed October 17, 1918. Serial No. 258,546.

*To all whom it may concern:*

Be it known that I, ANSON E. CARLTON, a citizen of the United States, residing at Paterson, in the county of Passaic and State of New Jersey, have invented certain new and useful Improvements in Hooks, of which the following is a specification.

In my application for patent for an anti-skid device for wheels filed March 20, 1918, Serial No. 223,526, I show on the anchorage member to which an anti-skid chain is attached hooks with which the ends of the chains are coupled, which hooks have plate springs bearing against their ends at the inside thereof to prevent the chains from uncoupling. The object of this my present invention is to provide a hook to be used for such a purpose, or any other purpose, in fact, with a novel means to keep a chain link or equivalent coupled therewith from being uncoupled, the same being devised so as to permit greater clearance for the chain link in coupling it with or uncoupling it from the hook and so as to make it more facile to couple and uncouple the link than the use of a spring makes possible and so that further a substantial and durable device of this kind shall result.

In the drawing,

Figure 1 shows the improved hook forming a part of an anti-skid device like that shown in my patent application aforesaid, the wheel to which the device is attached appearing in section;

Figs. 2 and 3 show the hook and a link connected therewith in side elevation, the two figures showing the link in two different positions; and Fig. 4 is a plan of the hook and the link.

$a$ is an anchorage member secured to the rim $b$ of a wheel and equipped with two hooks $c$ which may be welded thereto or otherwise form rigid parts thereof and are of the common substantially J-shaped type.

$d$ is the anti-skid chain, whose end links $e$ are coupled with the hooks $c$.

Instead of employing, as in my said application, a plate spring welded to the shank $c'$ of each hook and bearing against the inner side of its free end $c^2$, which requires an undesirable spacing of the parts $c'$ and $c^2$ from each other in order to afford the necessary clearance for the link $e$ in coupling it with or uncoupling it from the hook, I provide the hook with the following novel means to retain the link coupled with the hook:

Arranged in the free end $c^2$ of the hook is a collar $f$. This may be freely slipped on or off the hook when a pin $g$, as preferably a cotter pin, has been removed from a transverse hole $h$ which is formed in the end $c^2$ of the hook and between its extremity and the normal position of the collar $f$.

The collar in the adaptation illustrated is beveled peripherally, its diameter adjoining the extremity of the hook being its greater daimeter and leaving a space $i$ between the shank of the hook and its said free end $c^2$ less than the thickness of the link.

Having coupled the link with the hook, the collar is slipped onto the end $c^2$ and then the cotter pin $g$ introduced to form a stop device for the collar. The collar will then prevent escape of the link from the hook, and due to its bevel there is ample room for the link without unduly increasing the size of the bend-portion of the hook.

There is this further advantage of the bevel particularly if the collar is loose on the end $c^2$ and affords a more or less sharp edge at the outer end of its bore $j$, to wit, that any tendency of the link to displace the collar toward the extremity of the end $c^2$ resolves itself into the link camming the collar against said end $c^2$, more or less into the position shown in Fig. 3, so that the pressure of the collar is assumed more by the end $c^2$ than by the stop device $g$. As to this feature of my invention I do not wish to be limited to the collar being beveled for it is obvious that convergence between its periphery and the opposed part of the shank $c'$ of the hook is essentially the factor which causes the camming of the collar against the end $c^2$.

When the link is to be detached from the hook, it is of course only necessary to remove the cotter pin and slip off the collar.

Having thus fully described my invention, what I claim as new and desire to secure by Letters Patent is:—

1. In combination, with a link, a hook with which it is coupled, a collar slipped onto the free end of the hook, the periphery of the collar and the opposed face of the shank of the hook forming a link-receiving space converging away from the bend of the hook and of less width at its narrowest portion than the link is thick, and a removable stop device carried by the hook between its extremity and the collar.

2. In combination, with a link, a hook with which it is coupled, a beveled collar loosely arranged on the free end of the hook and having its greater diameter adjoining the extremity of the hook and leaving a link-receiving space between the shank of the hook and its said free end less than the thickness of the link, and a removable stop device in said hook between its extremity and the collar.

In testimony whereof I affix my signature.

ANSON E. CARLTON.

Copies of this patent may be obtained for five cents each, by addressing the "Commissioner of Patents, Washington, D. C."